United States Patent

Wienert

[15] 3,653,879
[45] Apr. 4, 1972

[54] ROTARY REACTOR AND METHOD FOR TREATING MELTS

[72] Inventor: Fritz O. Wienert, 394 Roosevelt Avenue, Lewiston, N.Y. 14305

[22] Filed: Oct. 14, 1969

[21] Appl. No.: 866,354

Related U.S. Application Data

[63] Continuation-in-part of Ser. No. 502,644, Oct. 22, 1965, abandoned.

[52] U.S. Cl. .......................... 75/93 R, 259/81 R, 266/34 P
[51] Int. Cl. ........................................ C22b 9/00, C21c 7/00
[58] Field of Search ............ 75/61, 45, 93; 266/34, 36 P; 13/10, 21; 259/72, 75, 81

[56] References Cited

UNITED STATES PATENTS

| | | | |
|---|---|---|---|
| 2,686,961 | 8/1954 | Ellefsen | 13/10 |
| 2,151,360 | 3/1939 | Tafel | 266/34 |
| 2,767,077 | 10/1956 | Perrin | 75/61 |
| 3,251,681 | 5/1966 | Wakamatsu et al. | 75/61 |

Primary Examiner—Donald L. Walton
Attorney—Ashlan F. Harlan, Jr.

[57] ABSTRACT

Mixing of melts and one or more reagents is carried out in an upright rotary reactor mounted for rotation about an upright axis that passes through the reactor but is not concentric with the vertical axis of the reactor. A major portion of the reaction is carried out while the reactor is rotated about the upright axis in one direction or the other at slowly changing speed whereby to maintain a difference in rotational speed between the melt and the reactor. The reactor has a lining, the inner wall of which is so shaped that at least a part thereof is adapted to divert the portion of a melt in the reactor which is adjacent the inner wall from a circular path when the reactor is rotated.

18 Claims, 4 Drawing Figures

Patented April 4, 1972

INVENTOR.
Fritz O. Wienert

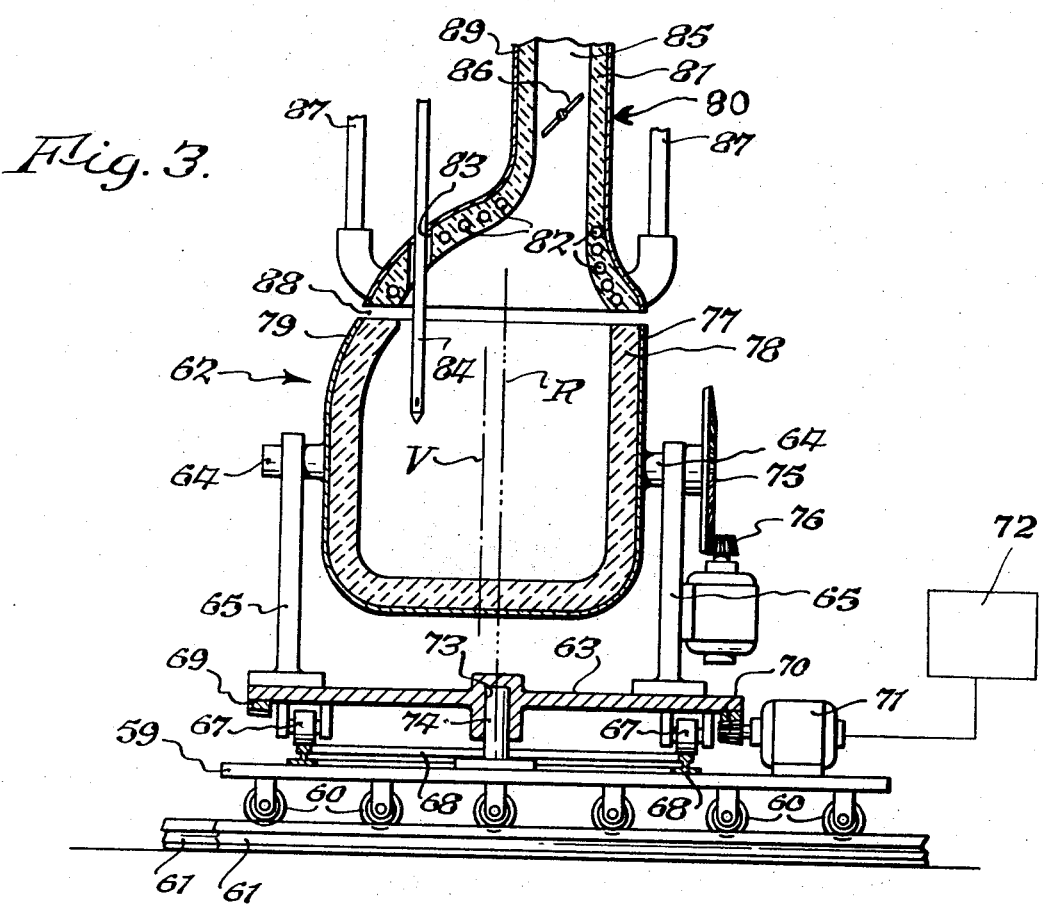
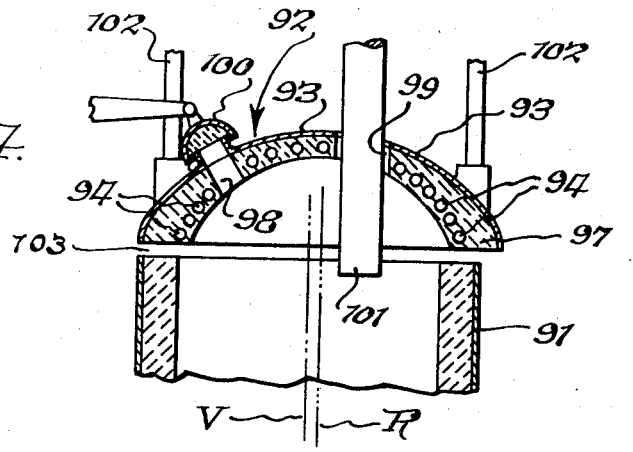

ROTARY REACTOR AND METHOD FOR TREATING MELTS

This application is a continuation-in-part of copending application Ser. No. 502,644, filed Oct. 22, 1965, and now abandoned.

BACKGROUND OF THE INVENTION

This invention relates to mixing, at high temperatures, heterogeneous systems at least one of which is liquid. It is particularly concerned with the recovery and/or refining of metals and alloys by treating molten liquids with solid, liquid, and/or gaseous material and with apparatus for such treatment.

In treating molten liquids by reacting one or more constituents thereof with another liquid or with solids or gases rather thorough mixing is necessary to bring about the reaction and to complete it as far as possible. A variety of methods and of apparati have previously been known or used to produce such mixing.

In some cases the mixing has been produced pneumatically, as for example in the Bessemer converter where the air blast also introduces the oxygen for reaction. In another known pneumatic process the impingement of a jet of oxygen on a molten iron bath causes mixing of the bath. It is also known to produce mixing by injecting inert gases into liquid baths. A disadvantage of these prior methods is that damage to the reactor lining and/or the nozzles used to inject the gas is caused by local overheating. Moreover, when two immiscible liquids, such as slag and molten metal, or a liquid and solids are to be reacted, the mixing by pneumatic means is slow.

Mechanical mixing has also been previously used. Since stirrers having the required high-temperature strength and resistance to corrosion are not available on an industrial scale, mechanical mixing has been achieved by rotation of a reactor about an axis that is horizontal or only slightly inclined from the horizontal or by rocking or shaking the entire reactor, often with a gyratory movement. All of the presently known reactors of these types have the disadvantage that when operating with molten metal and a slag, the slag comes in contact with a large area of the reactor lining and causes excessive corrosion. Further, heat losses in some areas result in solidification of the metal and/or crust formation. Moreover, since the reactor shell and its supports must be of massive structural design to accommodate unbalanced forces occurring during movement, they and the drive mechanism are quite expensive.

It is among the objects of the present invention to provide apparatus by which a melt and one or more solids, liquid, or gaseous reagents may be readily and thoroughly mixed.

Another of the objects of the invention is to provide apparatus of the character described in which reactions between a melt and one or more solid, liquid, or gaseous reagents may be conveniently and efficiently carried out.

A further object of the invention is to provide a novel process for thoroughly mixing one or more solid, liquid or gaseous materials with a melt.

Other objects and advantages of the present invention will be apparent from the following description taken in conjunction with the accompanying drawings in which:

SHORT DESCRIPTION OF THE DRAWINGS

Figure 1:
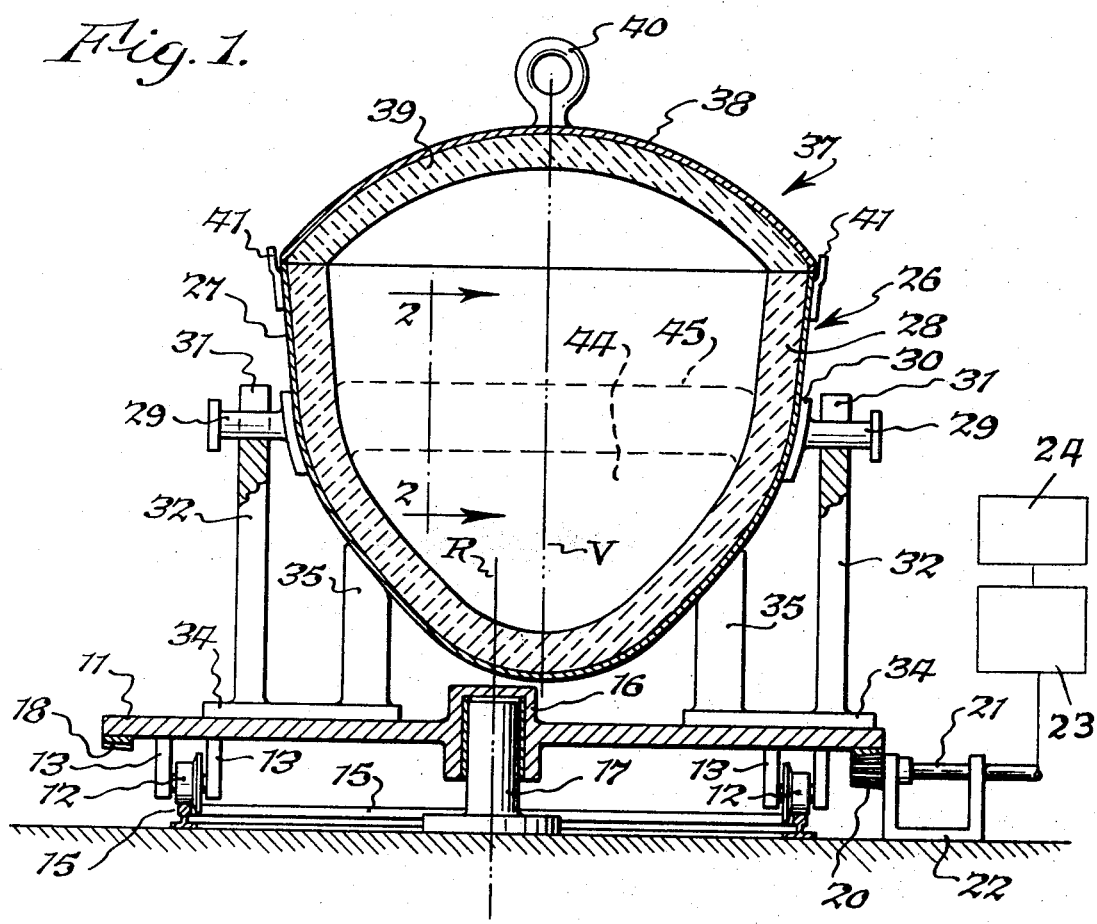
FIG. 1 is a view in vertical section of apparatus according to one embodiment of the present invention.

FIG. 3 is a view in vertical section of a modified form of apparatus according to the invention in which means is provided for introducing gaseous materials into a vessel which forms a portion of said apparatus and removing gases therefrom; and FIG. 4 is a fragmentary view in vertical section of another modified form of apparatus in which means is provided for introducing material into a vessel which comprises a portion of said apparatus and electrically heating the contents of said vessel.

In the drawings the showing is schematic and not to scale, it being understood that conventional details are omitted and that the invention may be employed with a wide variety of types of conventional vessels and accessories used in the art.

SUMMARY OF THE INVENTION

The above-mentioned objects of the present invention may be as described below achieved by the use, in mixing a melt and one or more reagents, of an upright or vertically disposed vessel having a generally round inner side wall, the vessel being mounted for rotation without gyratory movement around an upright axis which passes through the vessel. The construction is such that in each of a plurality of vertically spaced sections through said vessel and normal to said upright axis there are a plurality of points lying in said inner surface with respect to which said axis is eccentric. This may, for example, be conveniently achieved with vessels having a substantially circular cross section by offsetting the upright axis of rotation radially from the vertical geometrical axis of said vessel. If the shape of the vessel is such that horizontal cross-sections through said inner side wall are elliptical, the upright axis of rotation may be located between the foci of the ellipse. The vessel is rotated about the said upright axis with slowly changing speed, and, if desired, in alternating directions, whereby to maintain a difference in rotational speed between the melt and the vessel, the rotation of the vessel being such as to cause every point in said inner surface outside said upright axis to describe a circular path around said upright axis.

Referring now to the drawings for a clearer understanding of the construction of the novel apparatus, it will be seen that in FIG. 1 there is provided a turntable or rotatable platform 11. The turntable 11 is supported for rotation by a plurality of flanged wheels 12 rotatably supported in depending lugs or brackets 13 which may be welded or otherwise suitably secured to the under side of the platform 11 at even intervals adjacent the periphery thereof. The wheels 12 rest and travel on a circular track 15, which may be of conventional T-shape and rest on any desired base. At its center the turntable 11 is provided with an inverted cup or socket 16 which receives a center post 17 mounted at the center of the circular track 15, thus assuring stability. If desired, suitable bearings (not shown) may be provided within the socket 16 for preventing or reducing friction between the post 17 and the socket. Beneath the turntable 11, and secured around the periphery thereof by welding or other suitable means, is a circular gear 18 with which is engaged a pinion 20 carried by a rotary shaft 21 that is journalled in a bracket 22. The shaft 21 is driven by an electric motor 23 provided with suitable controls 24 adapted to increase and decrease the speed of the motor gradually in either direction of rotation.

On the upper face of the turntable 11 there is supported a mixing or reaction vessel designated comprehensively by the numeral 26. The vessel 26 comprises a shell 27, conveniently made of metal, and a lining 28 of suitable refractory material. Extending diametrically from the shell 27 of the vessel are a pair of trunnions 29, the bases 30 of which are fastened by welding or other suitable means to the shell. The trunnions are removably supported in the bifurcated ends 31 of supporting posts 32. The latter are preferably mounted on the turntable 11 by bases 34 integral with the posts, using bolts or studs (not shown). The positioning of the posts 32 on the platform 11 is such that the axis of rotation R of the turntable and vessel 26 and the vertical geometrical axis of the vessel 26 do not coincide, the axis R being radially offset from the axis V. A pair of guards 35 which, as shown, may also be formed integrally with the bases 34, project upwardly from the turntable at points radially inward from the posts 32, and serve to prevent tipping of the vessel 26. The bases 34 are preferably adjustably mounted to permit the amount of offset of the vessel's rotational axis to be changed.

As illustrated, the vessel 26 is generally conical in vertical section and circular in horizontal cross section, the cross-sectional area diminishing from top to bottom more rapidly adjacent the lower end than near the top although the bottom is rounded. It is to be understood, however, that this shape is not critical and vessels of other shapes, for example, that of the vessel shown in FIG. 3, or with uniform circular cross sections may be used. A cover 37 comprising a shell 38, preferably of metal, and a refractory lining 39 is provided for the vessel 26. A lifting ring 40 may be provided on the cover 37 for convenience in removing it and suitable means such as a plurality of fingers 41 may be provided around the rim of the vessel to retain the cover in place.

The apparatus just described is convenient for mixing either a liquid or a solid with a melt to bring about a reaction. For example, it is frequently desired to react one or more constituents of a covering slag with an underlying molten metal bath. The use of the apparatus of FIG. 1 to accomplish this is described below.

Molten metal and a reactive slag are poured into the vessel 26 and the lid or cover 37 is put in place, the refractory lining 28 of the vessel preferably being of a type having a low heat conductivity so as to avoid premature cooling of the contents of the vessel. The turntable 11 is then caused to rotate slowly by the electric motor 23 connected to the shaft 21. The inertia of the molten metal and the slag, designated, respectively, in FIG. 1 as 44 and 45, causes a slip between the two liquids and the inner face of the refractory lining 28 of the vessel.

By slowly increasing the speed of rotation of the turntable and the vessel 26, the above-mentioned slip is maintained and caused to progress toward the middle of the vessel. As the inertia and internal friction of the two liquids are different because of their different specific gravities and viscosities, this causes a substantial transport of unreacted metal and slag to the interface thereof where reaction takes place. Moreover, since the internal diameter of the vessel 26 increases from the bottom to the top, the effect of the centrifugal force, resulting from rotation, that is exerted upon the liquids therein, and particularly upon the metal, which is heavier, tends to cause the metal to rise along the inner wall of the vessel in an effort to move away from the axis of rotation.

As pointed out above and shown in FIG. 1, however, the vertical axis V of the vessel is radially displaced from the upright axis of rotation R of the turntable and vessel. Therefore, variations in centrifugal force cause the level of the contained liquids to rise higher in the part of the vessel that is farthest from the axis of rotation. The liquids, since they move more slowly than the wall of the vessel as the speed of the latter increases, will, as they circulate within the vessel, rise and fall in a series of waves resulting from the variations in centrifugal force. The amplitude, i.e. the height, of such waves will vary, when other conditions are equal, in accordance with the distance the vertical axis of the vessel is displaced radially from the axis of rotation of the vessel; the greater the distance the greater is the wave amplitude.

In consequence of the variety of different stirring movements in the two liquids, the interface between the liquids is continually supplied with fresh materials for reaction. However, the stirring action resulting from slip between the inner wall surface of the vessel 26 and the liquids diminishes as the slip decreases, i.e. when the speed of rotation of the liquids approaches the speed of rotation of the vessel. By varying the rotational speed of the vessel slip can be promoted so as to maintain efficient mixing.

Thus, as a relatively simple example, the speed of rotation of the vessel may be gradually increased to a desired maximum speed, maintained at this maximum for a short time if desired, and then gradually decreased to zero or a desired minimum speed. This cycle may be repeated one or more times as required. It is desirable, and in many cases necessary, for rotational speed of the vessel to be slowly changing throughout the major portion of the reaction or treatment, thereby maintaining slip or a difference in rotational speed between said vessel and the melt therein. By "slowly" or "gradually" is meant at such a rate that there will be no substantial splashing or overflow of the vessel contents. Obviously, the tendency to splash and/or overflow will be different for different melts, vessel shapes, vessel sizes, and other factors. It is also possible, of course, to reverse the direction of rotation of the vessel; and rotation thereof alternately in clockwise and counterclockwise directions with slowly increasing and decreasing speed in each direction has been found very effective in producing efficient mixing and facilitating the desired reaction.

The mixing produced by the above-described operation is largely produced by both liquids moving in generally horizontal paths. Some vertical motion is, however, imparted to the liquids, this being evidenced by the wave motion described above. Vertical motion may be also produced by other means, as for example by the use of a vessel in which the inner wall thereof is not symmetrical in horizontal section.

Another way to cause a greater amount of vertical motion of the liquids in the vessel is by the use of vanes or deflectors in the vessel. While such devices can be formed separately of suitable refractory or heat resistant material, the resulting structures are not practical. It has been found that vertical motion of the vessel contents can be quite successfully and conveniently obtained by providing deflectors integral with the inner wall of the vessel.

Figure 2:
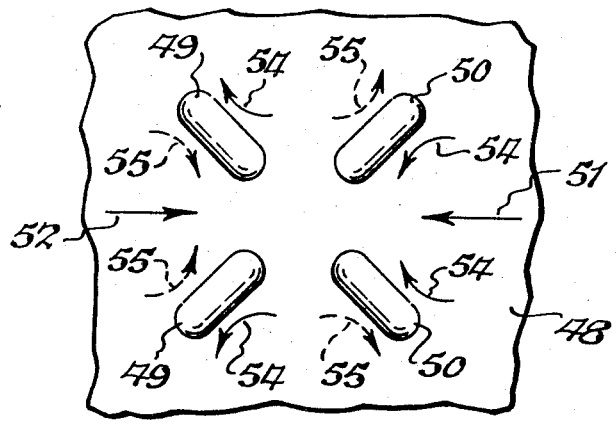
FIG. 2 is a fragmentary view of a portion of the interior wall of a vessel forming a portion of apparatus according to the invention.

As illustrated in FIG. 2, the deflectors are preferably formed as protruding ridges or elongated bosses on the refractory lining of the vessel and preferably integral therewith. Referring to FIG. 2, the numeral 48 designated a portion of the inner wall of the vessel 26 on which are provided a plurality of elongated protruding bosses 49 and 50 arranged in pairs. The bosses 49 are vertically spaced from each other, as are also the bosses 50 and the two pairs are horizontally spaced with the longitudinal axes of the bosses of each pair converging toward the center so that the four bosses are radiosymmetrically arranged. In the event both the wall 48 and the liquids in the vessel are moving in the direction indicated by the arrow 51, the normal horizontal flow of the liquids adjacent the wall 48 will be changed as indicated by the arrows 54 when the liquids are moving more rapidly than the wall and by the arrows 55 when the liquids are moving more slowly than the wall. In the event both the wall 48 and the liquids are moving in the direction indicated by the arrow 52, the flow will be changed as indicated by arrows 55 when the liquids are moving faster than the wall and by arrows 54 when the liquids are moving slower than the wall. Obviously, if the liquids are moving and the wall is stationary, the liquids are moving faster than the wall and the flow pattern may be determined, as explained above, from the direction of movement of the liquids. In case the wall and the liquids are moving in opposite directions, the wall may be considered as stationary for the purpose of determining the vertical flow tendencies of the liquids, although the intensity of the movement may be greater in such case. It is evident that the increase in vertical movement of the liquids in the vessel will result in a marked improvement in mixing of the different phases and facilitate reaction or treatment.

While the arrangement of protruding deflectors illustrated in FIG. 2 is quite simple and effective, it will, of course, be understood that other arrangements can be used and that they may be placed in larger or smaller groups and/or located at greater intervals around the inner wall 48 of the vessel. Obviously, deflectors of the types described may be employed in crucibles like those shown in any of the figures of the accompanying drawings as well as with other crucible designs when their use is desired.

As is evident from the foregoing description of the embodiment of the invention illustrated in FIG. 1, that embodiment is primarily intended and is most effective for the mixing of a plurality of liquids of different specific gravities or of a liquid and a granular solid of lower specific gravity than the liquid.

In FIG. 3 there is shown an embodiment of the invention intended primarily for treatment of a melt with a gas. In this figure a movable car or platform 59 provided with flanged wheels 60 adapted to ride on parallel tracks 61 is employed to carry a vessel such as the crucible 62. This vessel is pivotally mounted for tilting movement in a vertical plane on a turntable or rotatable platform 63 by means of trunnions 64 journalled in posts 65. The lower ends of the latter are secured by suitable means such as studs or bolts (not shown) to the turntable 63 which may be substantially identical with the turntable 11 shown in FIG. 1, having wheels 67 mounted on its under side which run on a circular track 68 that is bolted or otherwise securely fastened to the car 59. Also located on the underside of the turntable 63 is a peripheral gear 69 by which the turntable may be rotated, for example, by engagement of a pinion 70 secured on the shaft of an electrical motor 71. The latter is provided with suitable control means 72 by which the speed of the motor in either direction of rotation can be gradually or slowly increased or decreased. As in FIG. 1, the turntable is provided at its center with a socket 73 which receives the center post 74 that is secured by suitable means (not shown) to the upper face of the platform 59 and around which the turntable may rotate. It will be seen that, similarly to the structure illustrated in FIG. 1, the supporting posts 65 for the crucible or vessel 62 are so mounted on the turntable 63 that the vertical axis V of the crucible is axially displaced from the axis of rotation R of the turntable and crucible. As shown, one of the trunnions 64 may be provided with a bevel gear 75 which may be rotated by the motor-driven bevelled pinion 76 to tilt the crucible 62 when desired.

The crucible, as illustrated in FIG. 3, may be of any suitable construction with a metal shell 77 and a refractory lining 78 adapted to resist attack by molten metals, slags, and the like, and with an inner side wall that is substantially cylindrical. However, for a reason explained hereinafter, the crucible preferably has, as shown, the portion 79 of its upper end which is most distant from the axis of rotation R of the turntable 63 bent or curved inwardly, thereby forming the top rim of the crucible substantially as an annulus concentric with the upright axis R instead of the vertical axis V that passes through the center of the crucible bottom.

The crucible 62 is intended for use with a stationary cover or cowl 80 that has a flat, annular lower end approximately the same diameter as the upper end of the crucible 62 and a somewhat domed upper portion. The cover 80, which preferably comprises a metal shell 89 with a lining 81 of suitable refractory material having pipes 82 therein for circulation of cooling water, has an opening or port 83 through which reactive materials and/or a gas inlet such as a tube 84 may be introduced into the crucible 62, and is provided with a stack or outlet 85, flow through which may be controlled by a valve 86 therein, shown for convenience as a butterfly valve.

The operation, according to the invention, of the apparatus shown in FIG. 3 is in general quite similar to the operation described above in connection with the embodiment of FIG. 1. Rotation of the crucible or vessel 62 around the axis R will, of course, cause swirling movement of the vessel contents and facilitate mixing therewith material introduced through the port 83. This apparatus is particularly adapted for efficient treatment of molten steel with oxygen as described below.

In making molten steel with oxygen in accordance with the so-called "oxygen lancing" process, the molten ferrous metal may be poured into the crucible 62 before the crucible and the turntable 63 are moved, on the car or platform 59, beneath the cover 80. The turntable may then be rotated at varying speeds, in the manner described above, to cause stirring of the metal bath while oxygen is directed on the surface of the bath from the tube 84. The cover, which is supported from suitable means by hangers 87 and which is not required to be rotatable, can be raised or lowered to adjust the gap or clearance 88 between the bottom of the cover and the top of the crucible, thus regulating the amount of air that is admitted to combust the desired amount of the carbon monoxide that is formed as the oxygen reacts with the hot carbon in the metal bath. The stack 85 and connections (not shown) thereto carry the hot gases from the reaction vessel to any desired point where they can, if desired, be used for heating. Preferably, a slightly reduced pressure is maintained in the stack. The valve 86 can be used to regulate pressure in the combustion space within the crucible and cover. By making the rim of the crucible substantially annular and concentric with the axis of rotation R of the turntable, the cover which is supported concentrically with the axis R will remain centered over the top of the crucible even though the upright geometrical axis V of the crucible and its axis of rotation R are offset.

After the oxygen treatment of the bath is completed, the car carrying the crucible may be moved to a desired point and tilted by operation of the motor-driven gears 75, 76 to discharge the treated metal and the slag formed. If desired, the cover 80 may be raised sufficiently to permit tilting of the crucible in place, without moving the car 59, to discharge its contents.

The procedure described in the preceding paragraphs has several advantages. The improved stirring produced by the present invention permits faster input of oxygen to the crucible while preventing local overheating of the metal bath around the impact zone of the oxygen jet with the result that there is less evaporation of the metal with consequent fume formation by oxidation. Corrosion of the crucible lining is also reduced since the improved circulation of the bath tends to equalize the lining temperature. In addition, more carbon dioxide is produced by combustion of carbon monoxide within the crucible, thereby raising the temperature and allowing the use of a higher scrap content in the charge than has previously been feasible.

In some instances, it is desirable to stir or mix materials in a crucible while melting them with an electric arc. This may be conveniently and efficiently done in accordance with the present invention. In FIG. 4 apparatus suitable for carrying out such a process is depicted.

Referring to FIG. 4, the numeral 91 designates a crucible (shown only partially) which may be constructed substantially like the crucible 62 in FIG. 3, except that the upper portion is not constricted. The crucible 91 may also be mounted in any appropriate manner, but preferably in the same way as shown in FIG. 3, so as to be movable under the cover or cowl 92 and to be rotatable at varying speeds around an upright axis R which is offset from the vertical axis V of the crucible but is preferably parallel thereto.

The cover or cowl 92 comprises a shell 93 having cooling water pipes 94 embedded in a suitable refractory lining 97. Extending through the cover 92 is a port 98 for introduction of material into the crucible 91, said port being provided with a cap 100 of suitable design. Other ports through the cover 92 are provided to permit the introduction of electrodes, which may be of carbon or graphite, into the crucible. One of such ports, designated 99 and shown with electrode 101 passing therethrough, is illustrated in FIG. 4. Hangers 102, carried by suitable means (not shown), are provided for supporting the cover 92 and moving it vertically. Suitable mechanism (not shown), which may be conventional, is also provided for supporting and moving the electrodes.

The operation of the apparatus shown in FIG. 4 may perhaps best be explained in connection with its use in the melting of steel and iron scrap containing excessive contents of silicon and carbon, and the subsequent lowering of these amounts of impurities by treatment with iron ore and lime. A description of such operation is set forth below.

The scrap metal is charged into the crucible 91 and the car or platform carrying the crucible is moved so as to place the crucible under the cover 92, the electrodes (three electrodes for three-phase AC current are preferred) being raised to clear the top of the crucible. The cover, which is adjustable vertically, is lowered to provide only a narrow gap 103 between the rim of the cover and the rim of the crucible. It may be here pointed out that the diameter of the rim of the cover is greater than that of the rim of the crucible by an amount at least equal to the distance between the axes R and V. Consequently, as the crucible is rotated around the axis R, the upper end of the crucible is continually covered.

When the cowl or cover 92 is properly adjusted, the electrodes are lowered and electrical power is supplied to them from a suitable source (not shown) to establish and maintain arcing for melting the scrap. When a substantial pool of liquid metal has been formed in the crucible, rotation of the crucible may be started at a very slow speed which may be increased as the unmelted scrap diminishes in amount and is covered by molten metal. Iron ore, such as hematite, and lime or limestone, in such appropriate amounts as will be apparent to those skilled in the art, may then be introduced through the port 98 to react with the impurities in the molten metal while rotation of the crucible and the arc heating are continued. As the liquid content of the crucible increases, mixing of the crucible contents is obtained by slowly varying the speed, and if desired, also varying the direction of rotation of the crucible in the manner described in connection with FIG. 1. This results in a greatly increased speed of reaction of the iron ore and lime with the carbon and silica content of the metal. The desired temperature is reached and maintained by controlling the supply of power to the electrodes. Samples of the slag formed by the ore and lime, and of the metal may be taken through the port 98 for analysis from time to time. When the temperature and analysis are satisfactory, the power is shut off and the electrodes are lifted to clear the crucible top. Then the crucible may be moved on the platform to a desired location for discharge, or if desired, the cover 92 may be raised sufficiently to permit tilting of the crucible in place.

It may be noted that apparatus embodying the features shown in FIG. 4 and the method of mixing described above may be used for the reduction by carbon of the oxides of metals such as iron, manganese and chromium.

It will be understood that a number of modifications of and variations from the embodiments illustrated and described may be employed without departing from the invention. Thus, the crucibles in FIGS. 3 and 4 may be provided with deflecting projections on their inner faces if desired or the interior wall of the crucibles may be shaped otherwise to deflect the melts therein. Also, if desired, automatic controls (not shown) may be employed to vary the speed and/or the direction of rotation of the crucibles. The refractory linings for the crucible and cover may be selected from the wide variety of refractory materials commercially available for this purpose, the choice, of course, being dependent upon the nature of the materials to be used in the crucible.

I claim:

1. A process for treating melts, contained in an upright vessel having an inner surface, to facilitate reaction of said melt with a treating agent also contained in said vessel which comprises: rotating said vessel around an upright axis extending through said vessel and slowly changing the speed of such rotation throughout the major portion of the reaction whereby to maintain slip and relative motion between said inner surface and said melt, said inner surface having, in each of a plurality of vertically spaced sections through said vessel normal to said upright axis, a plurality of points at different distances from said axis, and said rotation being free from gyratory movement and such as to cause every point in said inner surface outside said upright axis to describe a circular path around said axis.

2. A process as set forth in claim 1 in which said upright axis of rotation is offset from the vertical geometrical axis of said vessel.

3. A process as set forth in claim 1 in which said vessel is alternately rotated at increasing and decreasing speeds.

4. A process as set forth in claim 1 in which said vessel is alternately rotated in clockwise and anti-clockwise directions.

5. A process as set forth in claim 2 in which said vessel is alternately rotated at increasing and decreasing speeds.

6. A process as set forth in claim 2 in which said vessel is alternately rotated in clockwise and anti-clockwise directions.

7. A process as set forth in claim 3 in which said vessel is alternately rotated in clockwise and anti-clockwise directions.

8. A process as set forth in claim 5 in which said vessel is alternately rotated in clockwise and anti-clockwise directions.

9. A process as set forth in claim 5 in which said melt alternately moves faster and slower than said vessel.

10. A process as set forth in claim 5 in which said vessel and said melt move in opposite directions part of the time.

11. Apparatus for treating melts with reaction agents which comprises an upright vessel open at the top and mounted on a turntable, said turntable and vessel being rotatable without gyratory motion around an upright axis of rotation extending through said vessel, said vessel being provided with a refractory lining having an inner wall, said inner surface having, in each of a plurality of vertically spaced sections through said vessel normal to said axis of rotation, a plurality of points at different distances from said axis, and means operatively connected to said turntable for rotating said turntable and vessel around said axis of rotation and for slowly changing the rotational speed thereof.

12. Apparatus as set forth in claim 11 in which said axis of rotation is offset from the vertical geometrical axis of said vessel.

13. Apparatus as set forth in claim 12 in which means is provided for tilting said vessel.

14. Apparatus as set forth in claim 12 in which inwardly protruding means is provided on the inner wall to divert said portion of said melt.

15. Apparatus as set forth in claim 12 in which said vessel is provided with a separate vertically movable, refractory-lined cover.

16. Apparatus as set forth in claim 15 in which said cover is provided with at least one port adapted for the introduction of reagents into said vessel.

17. Apparatus as set forth in claim 15 in which said cover is provided with means for exhausting gases from said vessel.

18. Apparatus as set forth in claim 15 in which said cover is provided with means for admitting electrodes into said vessel.

* * * * *